UNITED STATES PATENT OFFICE.

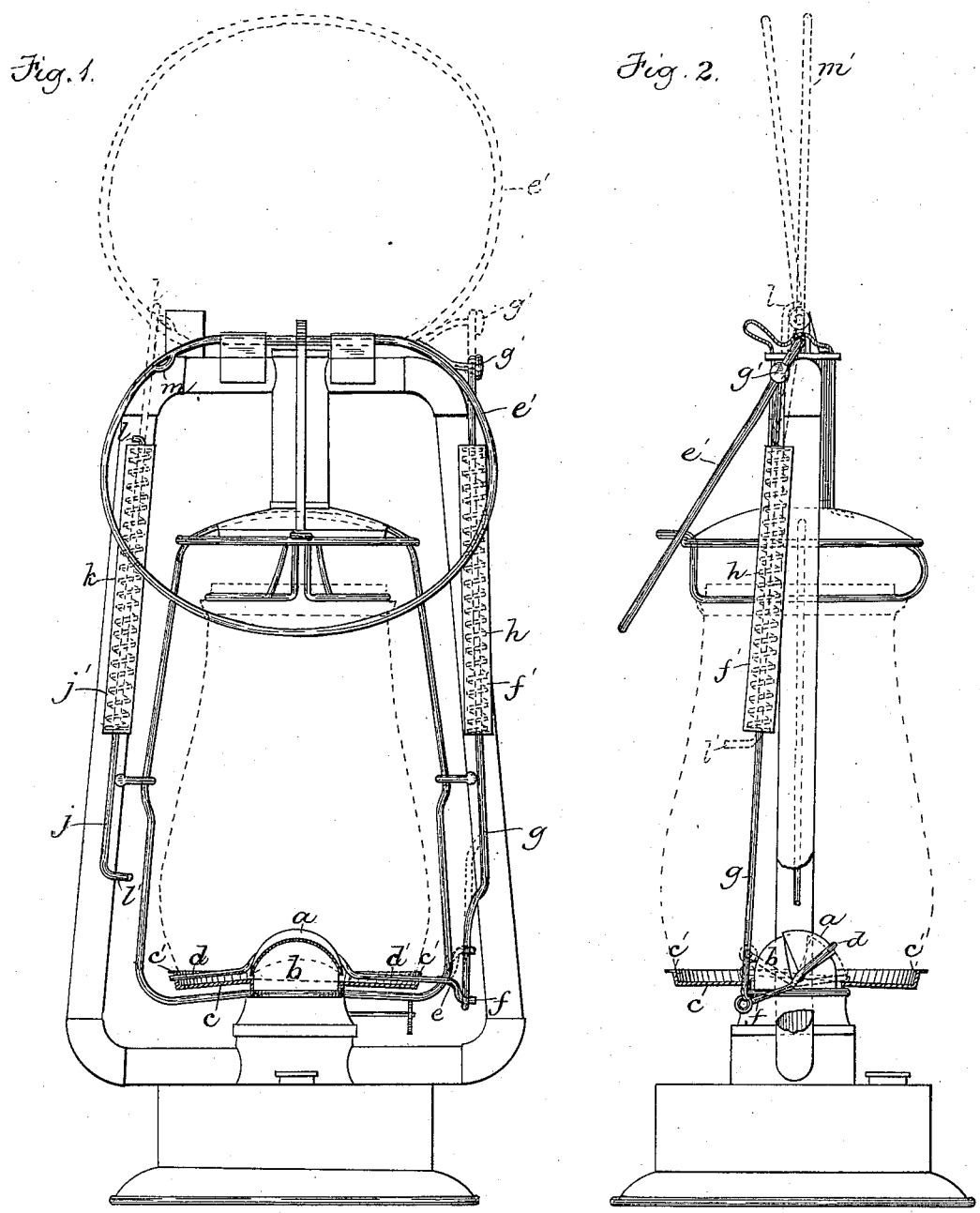

FRANCIS O. DEWEY, OF READING, MASSACHUSETTS.

SAFETY ATTACHMENT FOR LANTERNS.

SPECIFICATION forming part of Letters Patent No. 319,799, dated June 9, 1885.

Application filed March 2, 1885. (No model.)

*To all whom it may concern:*

Be it known that I, FRANCIS O. DEWEY, of Reading, in the county of Middlesex and State of Massachusetts, have invented certain Improvements in Safety Attachments for Lanterns, of which the following is a specification.

The object of this invention is to provide a lantern constructed with safety devices, whereby the burning-wick can be automatically extinguished in case the lantern falls or is dropped accidentally, thereby avoiding the liability of fires from such causes, all of which I will now proceed to describe.

Of the accompanying drawings, forming a part of this specification, Figure 1 represents a front elevation of a tubular lantern provided with my improvements. Fig. 2 represents a side view of the same with a portion of one of the tubes broken away in order to more clearly show the operation of the extinguishing devices.

The same letters of reference indicate the same parts in both the figures.

In carrying out my invention I provide an extinguisher, $a$, which is a concavo-convex plate formed to fit closely the exterior of the cone $b$ of the burner and secured to a strong wire, $d$ $d'$, which passes through the vertical flanges $c'$ of the circular plate $c$, (here shown in section,) the flanges of said plate forming the supports for the wire $d$ $d'$, which is bent at $e$ to form a crank, $f$. To said crank is attached a vertical wire, $g$, extending upwardly and passing through a tube, $f'$, (attached to one of the main tubes of the lantern,) to the bail or handle $e'$, and is journaled on an arm, $g'$, secured to said handle. The tube $f'$ contains a spiral spring, $h$. (Shown in dotted lines in Figs. 1 and 2.) Said spring is attached to the rod $g$, so that it exerts a downward pressure on said rod.

$j$ represents a piece of stout wire passing through a tube, $j'$, and having a connection with a spiral spring, $k$, (shown in dotted lines within the tube $j'$,) said wire being bent at its upper end to form a short hook, $l$, and at its lower end to form a handle, $l'$. Said hook is adapted to rest on the projection $m$ on the bail or handle of the lantern when said handle is raised, as shown in dotted lines in Figs. 1 and 2, for a purpose hereinafter described.

The operation of my improved device is as follows: When the lantern is being held by the handle $e'$ or being carried, said handle stands vertical, as shown in dotted lines at $m'$ in Fig. 2, and holds the extinguisher so that it uncovers the aperture in the cone $b$. When the handle is released from the hand after the lantern is deposited on a support, or when the lantern is accidentally dropped, the tension exerted upon the rod $g$ by the spring $h$ pulls the handle downwardly to the position shown in full lines in Figs. 1 and 2, said handle acting by gravitation as an aid to the spring $h$ in forcing down the rod, and by this movement rotating the wire shaft far enough to cause the extinguisher to cover the aperture in the cone of the burner, as shown in full lines in Figs. 1 and 2. When the lantern is at rest, and it is desired to keep the wick burning, the handle is secured in nearly a vertical position by raising the wire $j$ and resting the hook $l$ thereof upon the projection $m'$ on the handle, as shown in dotted lines in Figs. 1 and 2, so that the handle will be secured in the position that causes the extinguisher to uncover the aperture in the cone $b$. When the lantern is again taken in hand, the handle assumes the vertical position shown in dotted lines at $m'$, Fig. 2, which causes the hook $l$ to be disengaged and permits the handle to fall, so as to cover the aperture in the cone $b$ when the lantern is next released from the hand.

It will be seen that the above-described devices constitute a complete and effective safeguard against fire caused by dropping the lantern, as the extinguisher cannot fail to operate instantaneously upon the release of the handle.

I do not limit myself to the application of my safety devices to tubular lanterns, as said devices can be readily applied to lanterns of different construction with the same results.

The rod $j$ may be jointed at its upper end to the handle and detachably connected to a catch on one of the tubes when the handle is to be supported.

I claim—

1. The combination, with a lantern and its burner, of a swinging handle, a pivoted extinguisher which normally covers the flame-aperture of the burner, a crank connected to the extinguisher, and a rod connecting said crank with the handle of the lantern, whereby when the handle is held upright to support the lantern the extinguisher is held away from said aperture, and when the handle falls the extinguisher is permitted to act, as set forth.

2. The combination, with a lantern and its burner, of a swinging handle, a pivoted extinguisher having a crank, a spring whereby said extinguisher is normally caused to cover the flame-aperture of the burner, and a rod connecting the crank of the extinguisher and the handle of the lantern, whereby when the handle is used to support the lantern the extinguisher is held away from the burner, and when the handle is released the spring is permitted to operate the extinguisher, as set forth.

3. The combination, with the lantern and its burner, of the extinguisher having the crank $d'$, the swinging handle $m$, having the arm $g'$, the rod $g$, connecting the crank $d'$ and arm $g$, whereby the extinguisher is held away from the flame-orifice in the burner when the handle is used to support the lantern, and the spring whereby the extinguisher is turned to cover said orifice when the handle is released, as set forth.

4. The combination of a lantern, a swinging handle, a burner, a pivoted extinguisher having a crank, a rod connecting the extinguisher-crank and handle, and a rod sliding in guides on the lantern-frame and adapted to support the handle and thereby hold the extinguisher away from the flame-orifice of the burner, as set forth.

5. In a lantern, the combination of the swinging handle, the burner, the pivoted extinguisher having a crank, a rod connecting said crank and handle, the hooked rod $j$, which slides in guides on the lantern-frame and bears against the handle when the latter is in a nearly upright position, and a retracting-spring, whereby said rod is disengaged from the handle when the latter is raised to an upright position, as set forth.

In testimony whereof I have signed my name to this specification, in the presence of two subscribing witnesses, this 27th day of February, 1885.

FRANCIS O. DEWEY.

Witnesses:
F. H. DEWEY,
C. F. BROWN.